Figure 1:
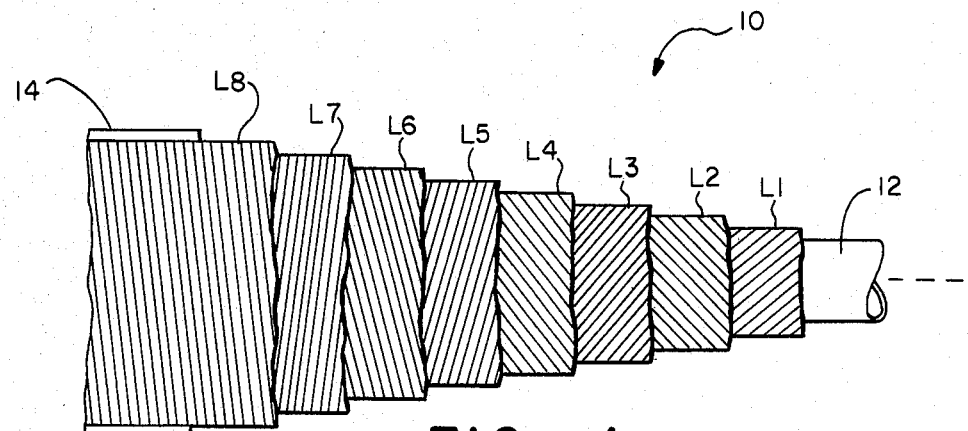

United States Patent [19]
Raghavan et al.

[11] Patent Number: 4,649,963

[45] Date of Patent: Mar. 17, 1987

[54] ULTRA-HIGH PRESSURE HOSE ASSEMBLY

[75] Inventors: Chidambaram Raghavan, Renton; John H. Olsen, Vashon, both of Wash.

[73] Assignee: Flow Industries, Inc., Kent, Wash.

[21] Appl. No.: 825,181

[22] Filed: Jan. 31, 1986

[51] Int. Cl.$^4$ ............................................. F16L 11/08
[52] U.S. Cl. .................................................. 138/130
[58] Field of Search ............... 138/129, 130, 133, 134, 138/153; 152/451, 526, 527, 533

[56] References Cited

U.S. PATENT DOCUMENTS

| | | | |
|---|---|---|---|
| 790,906 | 5/1905 | Marks | 138/130 X |
| 2,044,887 | 6/1936 | Laguidara | 138/130 |
| 3,212,528 | 10/1965 | Haas | 138/134 X |
| 4,364,418 | 12/1982 | Genini et al. | 138/134 X |
| 4,402,346 | 9/1983 | Cheetham et al. | 138/130 X |
| 4,425,919 | 1/1984 | Alston, Jr. et al. | 138/130 X |
| 4,514,245 | 4/1985 | Chabrier | 138/153 X |

*Primary Examiner*—Stephen Marcus
*Assistant Examiner*—Mark Thronson
*Attorney, Agent, or Firm*—Flehr, Hohbach, Test, Albritton & Herbert

[57] ABSTRACT

An ultra-high pressure hose assembly capable of withstanding sustained internal fluid pressures exceeding 60,000 psi is disclosed herein and consists essentially of an innermost tubular core, a plurality of successive tubular layers and an outer containment sleeve. The innermost tubular core and containment sleeve are designed to add substantially no structural integrity to the overall assembly but rather function only as a fluid barrier and containment structure for the tubular layers respectively. The outer tubular layers serve as structural members of the overall assembly and respectively consist of individual bands which are alternately helically wound around and directly against the layers immediately below them at predetermined helix angles. Each band in turn consists of a number of separate steel wires which have opposing flat sides and which are positioned in unconnected edge to edge relationship to one another so as to form the band. In addition, the bands of successive layers, starting with the innermost tubular layer, define successively increasing helix angles, whereby to cause all of the layers to share substantially in the overall loading of the assembly at its operating pressure.

17 Claims, 6 Drawing Figures

PAY-OUT REEL   WINDING STATIONS 1 TO 8   HAUL-OFF   TAKE-UP REEL

ULTRA-HIGH PRESSURE HOSE ASSEMBLY

The present invention relates generally to ultra-high pressure hose applications in which sustained internal fluid pressures are intended to exceed 60,000 psi and more particularly to an uncomplicated and yet reliable hose assembly which is designed to operate at sustained pressures in excess of 90,000 psi and sustain fatigue capabilities (at least 5000 cycles between 0 to 60,000 psi).

A low pressure fluid conveying hose assembly, for example the garden hose, may be readily provided in a relatively uncomplicated way. For example, a typical garden hose may be made entirely of rubber. Hoses intended for relatively high pressure applications, for example pressures at or about 5,000-10,000 psi, may require slightly more sophisticated wall structures but are nevertheless relatively uncomplicated in design. However, hoses intended for use in ultra-high pressure applications, for example pressures exceeding 60,000 psi, have heretofore been relatively complicated in design, relatively costly to provide and in many cases unreliable in use. A typical ultra-high pressure hose arrangement presently commercially available comprises a load bearing Delrin core covered with six wraps of round steel wire of diameter 0.012". The number of wires in each wrap increases from 45 to 61 and they are all wound at a constant helix angle of 53.5°±1° and adhesives and filament windings are applied between wraps. It takes many weeks to manufacture a length of this relativey complicated hose which bursts at about 65,000 psi and might not sustain more than a few cycles between 0 to 60,000 psi and back.

It is an object of the present invention to provide an ultra-high pressure hose assembly which is relatively uncomplicated in design, relatively economical to manufacture, and highly reliable in use.

A more particular object of the present invention is to provide an uncomplicated, economical and reliable ultra-high pressure hose assembly which is not only capable of operating at pressures typically thought to be ultra-high, for example pressures at about 60,000 psi, but which operates at pressures exceeding 90,000 psi and displays relatively high fatigue capabilities while retaining its relatively simplistic and economical as well as reliable characteristics.

Another particular object of the present invention is to provide an ultra-high pressure hose assembly which consists essentially of at most three different types of material, an innermost tubular core formed from one type of material, for example nylon, polypropylene or Teflon; and a plurality of successive outer tubular layers, each of which is constructed of a second material, specifically steel; and an outer containment sleeve formed from a third material, for example polyurethane or Hytrel.

Still another particular object of the present invention is to design the last mentioned hose assembly such that all of the outer tubular steel layers share substantially in the overall loading of the assembly at its operating pressure.

Yet another particular object of the present invention is to design the last mentioned hose assembly such that there is no more than about an 8% mean drop in tension (i.e., loading) between adjacent outer tubular layers at the operating pressure of the assembly, whereby all of these layers share substantially in the overall loading of the assembly at its operating pressure.

A further particular object of the present invention is to provide an ultra-high pressure hose assembly, which, with the exception of its innermost core and outermost containment sleeve, is constructed entirely of steel and yet which may be made to be relatively flexible.

As indicated above, the ultra-high pressure hose assembly disclosed herein consists essentially of an innermost tubular core, a plurality of successive outer tubular layers and an outermost containment sleeve. The innermost tubular core can be constructed of any suitable material, for example nylon, which will allow it to function as a fluid barrier without adding more than a negligible amount of structural integrity to the overall assembly. The outermost sleeve serves to contain the tubular layers and protect these layers from the environment and may be constructed of a suitable plastic material. The plurality of successive outer tubular layers provide substantially all of the structural integrity required by the assembly and respectively consist of individual bands which are alternatively helically wound around and directly against the layers immediately below them at predetermined helix angles. Each band consists of a number of separate steel wires which are positioned in unconnected side-by-side relationship to one another so as to form the band. The bands of successive layers starting with the innermost tubular layer define successively increasing helix angles.

An ultra-high pressure hose assembly designed in accordance with an actual working embodiment of the present invention consists of the innermost tubular core, outer containment sleeve, and eight other tubular layers recited above, which for purposes of identification are designated as layers L1 through L8 starting with the innermost layer. In this actual working embodiment, each of the tubular layers consists of a specific number of separate steel wires and each defines a helix angle (in degrees, rounded off to the nearest one-tenth of a degree with a tolerance of ± one-tenth of a degree), as follows:

| Layer | Wires | Helix angle |
| --- | --- | --- |
| L1 | 20 | 39.0° |
| L2 | 20 | 44.8 |
| L3 | 20 | 48.9 |
| L4 | 20 | 51.6 |
| L5 | 10 | 73.2 |
| L6 | 10 | 75.2 |
| L7 | 5 | 82.1 |
| L8 | 5 | 83.5 |

The actual hose assembly just described is capable of operating at sustained fluid pressures exceeding 90,000 psi and has displayed a burst pressure of as high as 97,000 psi. In addition, this particular hose was subjected to 6000 cycles of pressurization from zero to 60,000 psi before failing, thereby displaying ultra-high fatigue capabilities.

Figures 2A, 2B, 2C:
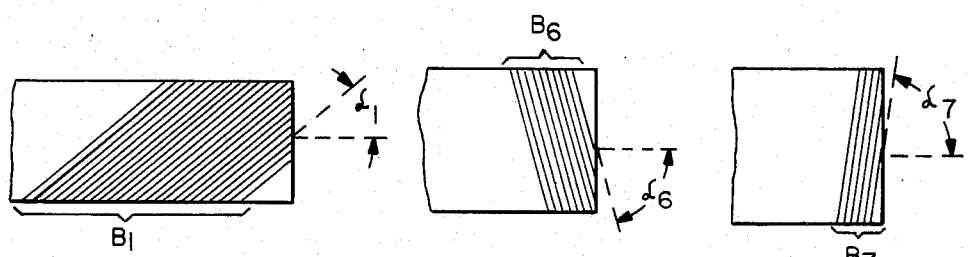
Figure 3:
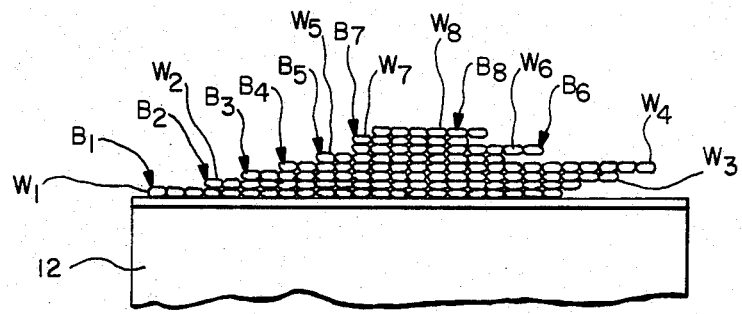
Figure 4:
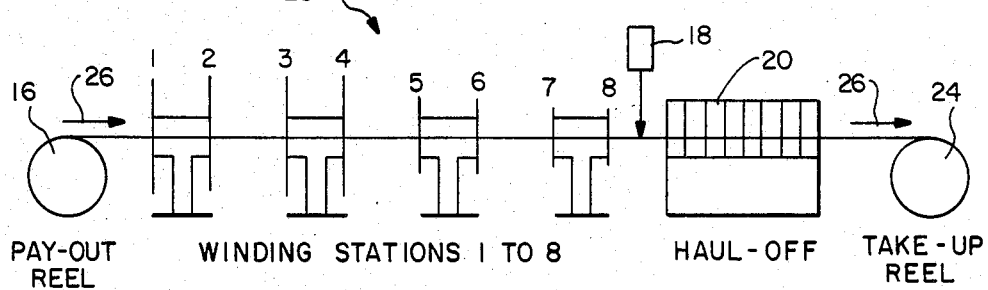

This particular ultra-high pressure hose assembly which is designed in accordance with the present invention generally will be discussed in more detail hereinafter in conjunction with the drawing wherein:

FIG. 1 is a perspective view of an ultra-high pressure hose assembly which is designed in accordance with the present invention and which is shown partially broken away so as to illustrate its various layers including an innermost tubular sealing core and eight successive tubular structural layers;

FIGS. 2a, 2b and 2c diagrammatically illustrate certain aspects of a first, sixth and seventh tubular layers forming part of the overall assembly of FIG. 1;

FIG. 3 diagrammatically illustrates a segment of the hose assembly of FIG. 1 in longitudinal section; and FIG. 4 diagrammatically illustrates an overall assembly for manufacturing the hose of FIGS. 1-3.

Turning now to the drawing, wherein like components are designated by like reference numerals throughout the various figures, attention is first directed to FIG. 1 which illustrates an ultra-high pressure hose assembly which is designed in accordance with the present invention and which is generally indicated by the reference numeral 10. This assembly is shown including an innermost tubular core 12, eight successive outer tubular layers which for purposes of consistency with the appended claims will be designated as layers L1 through L8, starting with the innermost layer, and an outer containment sleeve 14. The innermost tubular core 12 can be constructed of any suitable material, for example nylon, which allows it to function as a fluid barrier at the operating pressures of the assembly without adding more than at most negligible structural integrity to the overall assembly and the operating pressure of the assembly. In fact, the inner core should be sufficiently resilient, flexible or deformable so as to readily expand outward when subjected to the ultra-high internal pressures of the overall assembly. In that way, most of the loading will be transferred through it to the structural layers which are designated to take such loads. If this were not the case, the core might burst prematurely under such ultra-high pressures. At the same time, when the assembly is at ambient pressure, the core along with the sleeve serves to hold it together structurally. The outermost containment sleeve also serves as a means of protecting the inner layers from the ambient surroundings and also keeps the inner layers in place when the hose is cut at some point. Without the sleeve, these outer layers would spring out. The sleeve, like the inner core, is not intended to add any appreciable structural integrity to the overall hose at the operating pressure of the assembly but should be sufficiently resilient or flexible to insure that the overall hose is flexible.

As will be seen hereinafter, the eight other tubular layers L1-L8 are constructed entirely of steel and provide all of the structural integrity required by the assembly so as to allow the latter to operate at its ultra-high pressures. In this regard, for purposes of the present invention, ultra-high pressures are defined as pressures at or exceeding 60,000 psi. Assembly 10 is designed to operate at and above that pressure and, as will also be seen hereinafter, the actual working hose designed in accordance with the present invention has been subjected to sustained internal fluid pressures in excess of 90,000 psi and the fatigue test described above.

The successive outer tubular layers L1-L8 respectively consist of individual bands which are alternately helically wound around and directly against the layers immediately below them at predetermined helix angles. While these bands are generally illustrated in FIGS. 1 and 3, the bands forming layers L1, L6 and L7 are more clearly illustrated in FIGS. 2a, 2b and 2c, respectively. The band forming layer L1 is generally indicated at B1 in FIG. 2A, the band forming layer L6 is generally indicated at B6 in FIG. 2B and the band forming layer L7 is generally indicated at B7 in FIG. 2C. Note that the bands B1 and B7 are wrapped from left to right starting from the bottom, as viewed in FIGS. 2a to 2c while band B6 is wrapped from right to left. When it is stated herein that the bands are alternately helically wound around and directly against layers immediately below them what is meant is that the first band B1 is wound in one direction, for example from left to right as viewed in FIG. 2a, the second band B2 (see FIG. 3) is wound in the opposite direction, for example from right to left, the third band B3 is wound from left to right, and so on. The term "helix angle" used herein refers to the angle at which a given band is wound with respect to the axis of its tubular layer. First, as illustrated in FIG. 2a, the band B1 is wound around the layer below it at a helix angle of a1. As illustrated in FIGS. 2b and 2c, the bands B6 and B7 define helix angles a6 and a7, respectively. As generally illustrated in FIG. 1, the bands of successive layers starting with band B1 define successively increasing helix angles for reasons to be discussed hereinafter. Thus, a1 is smaller than a2 which is smaller than a3 and so on.

Each band B1 through B8 forming its respective outer tubular layer L1 through L8 consists of a number of separate steel wires which have opposing flat sides (see FIG. 3) with opposite rounded edges and which are positioned in unconnected side-by-side relationship to one another so as to form the band, as best illustrated in FIG. 3. Thus, the band B1 consists of a plurality of wires W1, the band B2 consists of a plurality of wires W2 and so on through wires W8 which make up band B8. In a preferred embodiment, the wires are identical in cross-sectional configuration. In an actual working embodiment, each wire is 12.5 mils thick and 32 mils wide (at the widest points). It is important that these wires have flat sides and that the wires forming any given band be of the same thickness. In that way, the wires of any given band can be made to rest in surface to surface (side-to-side) contact with the wires above and below them. At the same time they are preferably made to engage one another in edge to edge relationship so as to minimize any gaps between adjacent wires in the same band. Advantages of these positional features will be discussed below.

As can best be seen in FIG. 3, not all of the bands making up the various outer tubular layers L1-L8 include the same number of separate wires W. The number of wires forming each band is dictated in large part by the helix angle that band defines. A band defining a relatively small helix angle will generally require more individual wires than a band defining a relatively large helix angle if the gaps between the wires are to be kept at a minimum. In the particular embodiment illustrated and in an actual working embodiment of the present invention, each of the first four bands B1-B4 consists of twenty separate wires while the next two bands B5 and B6 each consists of ten wires and the outer two layers each consists of five separate wires. In this same embodiment, the bands forming layers L1-L8 define helix angles (in degrees rounded off to the nearest one-tenth of a degree), as previously set forth.

As stated above, hose assembly 10 is designed for ultra-high pressure applications. In order to accomplish this while retaining the assembly's simplicity of design, it is important that all of the structural layers, that is, all of the outer tubular layers L1-L8 share substantially in the overall loading of the assembly at its operating pressure and that a single layer is not unnecessarily subjected to excessive stress. The various outer tubular layers are made to more uniformly share the operating load by designing them to define successively increasing helix angles, starting with the innermost layer L1. This is contrasted with a design in which all of the layers are wound at the same helix angle or where the inner layers are wound more tightly (e.g., at greater helix angles) than outer layers. In both of these latter cases, the innermost layer or layers take up most if not all of the load of the assembly and the outer layers contribute little to the assembly's structural integrity. As a result, the innermost layer will tend to break first, thereby exposing the next layer which then will break, and so on until the entire assembly bursts. By winding the innermost layer loosely (e.g., at relatively small helix angles) and successively increasing helix angles with successive layers, the innermost layer is allowed to expand radially outwardly in response to its load to a greater extent than the second layer and this latter layer is allowed to expand outwardly to a greater extent then the third layer, and so on. That way, the load is shared more evenly between the various layers. In an actual working embodiment which will be defined in more detail hereinafter and which consists of inner core 12 and the eight layers L1-L8 illustrates in FIG. 1, (each defining an associated helix angle referred to above), there was no more than about an 8% mean drop in tension between adjacent layers L1-L8 at the operating pressure of the assembly.

It is not only critical to provide the tubular layers L1-L8 so that they define successively increasing helix angles as discussed above but it is also critical that the wires of any given layer engage the wires below them and the wires above them in surface-to-surface contact. This is to be contrasted with point-to-point contact which results when wires having circular cross sections are used. In this latter case, due to the operating pressures of the assembly, the round wires of the innermost layer tend to cut into the wires of the next outer layer, as a "wire cutter" might do, thereby causing the wires forming the second layer to break sooner than they would if the contact between the two layers were flat, as in the surface-to-surface contact achieved by using flat wires. In addition, because of the point-to-point contact between these adjacent layers of "round" wires, the innermost layer tends to deform further into the next outer layer and therefore it tends to extend radially outwardly more so than would be the case with flat wires. As a result, the inner layer is subjected to greater stress than would be the case if it did not deflect so far outwardly.

Still another objective in designing overall assembly 10 in view of the ultra-high pressures to which it is subjected is to minimize and preferably substantially eliminate any gap between adjacent wires in a given layer. This is particularly important with respect to the innermost ones of the outer tubular layers, specifically layers L1-L4. These gaps may be kept to a minimum or virtually eliminated by appropriately selecting the number of wires making up a given band in view of the helix angle that band is to define. If a gap is present in, for example, layer L2 at the ultra-high operating pressures of the assembly, the individual wires which lie directly under that gap in layer L1 stand unsupported into the gap and can ultimatey break prematurely at that point.

While it is desirable to substantially eliminate any gaps between adjacent wires for the reasons just recited, it has been found that the overall assembly can be made substantially more flexible if the bands of layers L7 and L8 are helically wound with substantially greater gaps between turns than the gaps between turns of layers L1 through L6. Specifically, in the case where gaps are substantially eliminated from all eight layers, a given section of the overall hose assembly, for example, a section 63 inches long, can be easily bent to a radius of curvature of 20 inches. By providing gaps in the outer two layers L7 and L8 approximately 10 mils in width, the same section of the hose assembly can be readily bent to a radius of curvature of 11 inches.

Overall ultra-high pressure hose assembly 10 has been described as including inner tubular core 12, outer containment sleeve 14, and the specifically described tubular layers L1-L8. In a preferred embodiment of the present invention, the hose assembly consists essentially of the inner core, the outer containment sleeve and these tubular layers. In that way, the overall assembly remains relatively simplistic in design and economical to provide. At the same time, as discussed above the assembly is reliable at ultra-high pressures because these particular layers are made to cooperate with one another (1) to more uniformly distribute the load between layers, (2) to prevent any given layer from bending radially outwardly to a greater degree than necessary and thereby cut into the adjacent outer layer, either breaking in the process or causing the adjacent layer to break, and (3) to prevent one of the inner tubular layers from expanding into gaps in the adjacent outer layers. However, while it is important that the overall hose assembly consist essentially of an inner core, outer containment sleeve and plurality of tubular layers, the present invention is not limited to the eight particular layers shown or the particular number of wires shown in each layer.

A preferred embodiment of the present invention has been described briefly above. An actual working embodiment is described in more detail below in conjunction with Table I to follow. In this particular working embodiment, the liner or core is constructed of nylon and each tubular layer is constructed of a plurality of steel wires. The outer containment sleeve was omitted from the actual embodiment for purposes of simplicity and would have at most a negligible effect on the data in Table I. As indicated above, the purpose of the sleeve is not structural other than to contain the tubular layers and as a means of protection.

Referring to Table I below, all distance measurements are in inches. The helix angle is shown in degrees and radians, tension is in pounds and pressure is measured in psi. Note that the measurement for circumstances minus wire coverage has been provided and represents the gap between adjacent wires. The pitch represents the distance in inches along the hose axis by one complete turn of a spiral. Also note that solidity refers to the minimum pitch (possible) divided by the actual pitch. It should be noted that the assembly described by Table I displays a burst pressure which exceed 97,000 psi operated at sustained pressures in excess of 94,000 psi. It should also be noted specifically that the various layers L1-L8 share substantially in the overall loading, as indicated by the tension in each layer. Note that the tension only drops off slightly in each of the first four layers, and, in fact, increases in layer 5.

While an actual working embodiment has been illustrated and described with respect to Table I below, it is to be understood that the present invention is not limited to that actual working embodiment. However, at the same time, it is to be understood that the particular embodiment illustrated does exemplify the present invention.

An actual working embodiment of the present invention has been described briefly above. The same embodiment is described in more detail in Table I immediately below.

facture a given length of hose assembly. This is accomplished by drawing the core through the various stations in the direction of arrow 26, as indicated above. As this is done, the first winding station number 1 utilizes a readily available machine to automatically wind layer L1, which, as indicated above, consists of 20 wires, around the core at a helix angle a1. Thereafter, layer L2

TABLE I

| Steel Hose #7 | Liner | Wrap #1 | Wrap #2 | Wrap #3 | Wrap #4 | Wrap #5 | Wrap #6 | Wrap #7 | Wrap #8 |
|---|---|---|---|---|---|---|---|---|---|
| Outside dia. | 0.25 | 0.275 | 0.3 | 0.332 | 0.357 | 0.382 | 0.407 | 0.432 | 0.457 |
| Wire thickness | | 0.0125 | 0.0125 | 0.0125 | 0.0125 | 0.0125 | 0.0125 | 0.0125 | 0.0125 |
| Inside dia. | 0.19 | 0.25 | 0.275 | 0.307 | 0.332 | 0.357 | 0.382 | 0.407 | 0.432 |
| Wire Width | | 0.032 | 0.032 | 0.032 | 0.032 | 0.032 | 0.032 | 0.032 | 0.032 |
| Average dia. | | 0.2625 | 0.2875 | 0.3195 | 0.3445 | 0.3695 | 0.3945 | 0.4195 | 0.4445 |
| Circumference | | 0.82467 | 0.90321 | 1.00374 | 1.08228 | 1.16082 | 1.23936 | 1.3179 | 1.39644 |
| Wire coverage | | 0.82301 | 0.90242 | 0.97371 | 1.03102 | 1.10437 | 1.25416 | 1.1604 | 1.41234 |
| Helix angle | | 0.6799 | 0.78243 | 0.85359 | 0.90111 | 1.27682 | 1.31279 | 1.43247 | 1.45727 |
| Helix degrees | | 38.9555 | 44.8297 | 48.9072 | 51.6294 | 73.1564 | 75.2173 | 82.0744 | 83.495 |
| Pitch | | 1.02 | 0.90859 | 0.87539 | 0.8569 | 0.35143 | 0.32705 | 0.18347 | 0.15922 |
| Elastic modulus | 1 | 3E+07 | 3E+07 | 3E+07 | 3E+07 | 3E+07 | 3E+07 | 3E+07 | 3E+07 |
| Number of wires | | 20 | 20 | 20 | 20 | 10 | 10 | 5 | 5 |
| Minimum pitch | | 1.01794 | 0.9078 | 0.8492 | 0.81631 | 0.33434 | 0.33095 | 0.16154 | 0.16104 |
| Solidity | | 0.99799 | 0.99913 | 0.97008 | 0.95264 | 0.95137 | 1.01194 | 0.88049 | 1.01139 |
| Poisson Ratio | 0.4811 | 0.3 | 0.3 | 0.3 | 0.3 | 0.3 | 0.3 | 0.3 | 0.3 |
| Dia Growth | 0.0134 | 0.01039 | 0.00811 | 0.00626 | 0.00473 | 0.00342 | 0.00249 | 0.00182 | 0.00133 |
| Dia Strain | | 0.03958 | 0.0282 | 0.01958 | 0.01372 | 0.00924 | 0.00631 | 0.00435 | 0.00299 |
| Length Strain | −0.0094 | −0.0094 | −0.0094 | −0.0094 | −0.0094 | −0.0094 | −0.0094 | −0.0094 | −0.0094 |
| Wire Strain | | 0.00996 | 0.00929 | 0.00706 | 0.00481 | 0.00768 | 0.00529 | 0.00409 | 0.00283 |
| Tension | | 110.463 | 104.432 | 79.2458 | 53.2725 | 89.4963 | 62.0341 | 48.4574 | 33.997 |
| Int-lyr pres | 96561.7 | 94056.3 | 75601.9 | 58497.5 | 45872.8 | 37199.2 | 22003.6 | 11639.7 | 4910.71 |
| OD Growth | 0.00133 | | | | | | | | |
| OD Gr. rate | 0.00024 | | | | | | | | |
| Step | 0.00037 | | | | | | | | |
| Add. Disp. | | 9.8E−05 | 7.6E−05 | 6E−05 | 4.8E−05 | 2.9E−05 | 1.5E−05 | 6.4E−05 | 0 |
| Ax. ten. comp | −217.48 | 1718 | 1481.28 | 1041.73 | 661.371 | 259.322 | 158.28 | 33.4073 | 19.2571 |
| Applied ten. | 13.0286 | 6016.67 | Bore Force | | | | | | |
| Wire ten. relief | | −9.0722 | −7.0197 | −5.5047 | −4.4639 | −2.6404 | −1.3968 | −0.5893 | 0 |
| | | 7.4E−05 | 0 | 0 | 0 | 0.00011 | 0.00011 | 0.00012 | 0.00012 |
| Breaking ten. | 120.275 | | | | | | | | |
| Safety Fact. | | 1.0067 | 1.08449 | 1.44828 | 2.17394 | 1.31441 | 1.91634 | 2.46992 | 3.53781 |
| Min. S. Fact. | 1.0067 | | | | | | | | |
| Burst Pres. | 97208.2 | 70.3032 | Moment | | | | | | |
| Wind. dir. | | 1 | −1 | 1 | −1 | 1 | −1 | 1 | −1 |
| Wind. Mom | | 2640.62 | −2432.3 | 3852.64 | −4321.5 | 2829.19 | −3051.5 | 1661.97 | −1766.6 |
| Twisting Mom | | 182.307 | −211.67 | 190.816 | −143.89 | 158.251 | −118.31 | 50.3343 | −37.536 |
| | | 1.0067 | 1.08449 | 1.44828 | 2.17394 | 1.31441 | 1.91634 | 2.46992 | 3.53781 |
| | | 110.463 | 104.432 | 79.2458 | 53.2725 | 89.4963 | 62.0341 | 48.4574 | 33.997 |
| Circ-wire cov. | | 0.00166 | 0.00079 | 0.03003 | 0.05126 | 0.05645 | −0.0500 | 0.0500 | 0.0500 |
| | | 0.00164 | 0.00078 | 0.02975 | 0.05078 | 0.05592 | −0.0147 | 0.15602 | −0.0158 |
| Wind. Ten. | | 1600 | 1200 | 1600 | 1600 | 1600 | 1600 | 1600 | 1600 |

Having described the hose assembly illustrated in FIGS. 1-3, attention is now directed to the way in which it is manufactured in accordance with a preferred embodiment of the present invention. Turning specifically to FIG. 4, the core 12 which is initially manufactured by any suitable means is stored on a pay out reel 16 supported by suitable means (not shown) at the beginning of the manufacturing line. An initial length of the core is drawn through eight winding stations generally indicated by station numbers 1-8, past a winding securement station 18, through a haul off station 20 and finally to a take-up reel 24. The haul off station 20 serves to pull the core and its associated windings (as will be described) in the direction indicated by arrows 26 and around take-up reel 24. As will be seen below, the overall manufacturing apparatus which is generally indicated by the reference numeral 28 is designed to manufacture discrete lengths of a hose assembly, for example 1000 foot lengths. The way in which each length of hose assembly is manufactured will be described immediately below.

After a lead section of core material is threaded through the winding and haul stations and connected to take-up reel 24, the overall apparatus is ready to manufacture a given length of hose assembly. This is accomplished by drawing the core through the various stations in the direction of arrow 26, as indicated above. As this is done, the first winding station number 1 utilizes a readily available machine to automatically wind layer L1, which, as indicated above, consists of 20 wires, around the core at a helix angle a1. Thereafter, layer L2 is wound layer L1 by a suitable winding machine at station 2 at helix angle a2, and so on, until all eight layers L1-L8 are wound, one on top of the other, over core 12. Station 18 provides a suitable and readily providable machine to temporarily wind Kevlar string or other suitable string means around the front or upstream end of the cable assembly as it passes from station 8 and the downstream end in order to temporarily hold the ends in place and therefore temporarily contain the layers in position around the core. This overall hose assembly is then wound around the take-up reel. Thereafter, the outer containment sleeve 14 is formed over outermost tubular layer L8 by any suitable means. In a preferred embodiment, the outer containment sleeve is extruded from a conventional extrusion apparatus directly over the outer layer L8. At that time, the ends of the overall assembly including the temporary winding strings can be severed from the assembly.

The overall process just described is of the preferred process for making hose assembly 10. However, the hose assembly is not limited to that particular manufacturing process, although it is uncomplicated, economical and rapid in operation.

What is claimed is:

1. An ultra-high pressure hose assembly capable of withstanding sustained internal fluid pressure exceeding 60,000 psi, said assembly consisting essentially of:
   (a) an innermost tubular core which adds at most negligible structural integrity to the overall assembly at its operating pressure but which functions as a fluid barrier;
   (b) a plurality of successive tubular layers respectively consisting of individual bands which are alternately helically wound around and directly against the layers immediately below them at predetermined helix angles whereby to form the plurality of tubular layers, each band consisting of a number of separate steel wires which have flat opposing sides and which are positioned in unconnected edge to edge relationship to one another so as to form the band, the bands of successive layers starting with the innermost tubular layer defining successively increasing helix angles;
   (c) an outer containment sleeve which adds at most negligible structural integrity to the overall assembly at its operating pressure but which contains said tubular layers.

2. An ultra-high pressure hose assembly according to claim 1 wherein said plurality of tubular layers include eight such layers which for purposes of identification are designated at layers #1 through #8 starting with the innermost layer.

3. An ultra-high pressure hose assembly according to claim 2 wherein the band forming each of said eight tubular layers consists of a specific number of separate ones of said steel wires, as follows:

| Layer | Wires |
|---|---|
| #1 | 20 |
| #2 | 20 |
| #3 | 20 |
| #4 | 20 |
| #5 | 10 |
| #6 | 10 |
| #7 | 5 |
| #8 | 5 |

4. An ultra-high pressure hose assembly according to claim 2 wherein the band forming each of said eight tubular layers defines a helix angle (in degrees, rounded off to the nearest one degree), as follows:

| Layer | Helix angle |
|---|---|
| #1 | 39 |
| #2 | 45 |
| #3 | 49 |
| #4 | 52 |
| #5 | 73 |
| #6 | 75 |
| #7 | 82 |
| #8 | 84 |

5. An ultra-high pressure hose assembly according to claim 2 wherein said plurality of layers consist of said eight layers.

6. An ultra-high pressure hose assembly according to claim 2 wherein at least the bands of said layers #1 through #6 are helically wound with substantially no gaps between turns.

7. An ultra-high pressure hose assembly according to claim 6 wherein the bands of said layers #7 and #8 are helically wound with substantially greater gaps between turns than the gaps between the turns of said layers #1 through #6, whereby the overall assembly is substantially more flexible than it would be if the bands of layers #7 and #8 were wound with substantially no gaps between turns.

8. An ultra-high pressure hose assembly according to claim 1 wherein said plurality of tubular layers consist of a predetermined number of said layers and wherein said layers are configured to define specific helix angles such that the overall burst pressure of said assembly exceeds 90,000 psi.

9. An ultra-high pressure hose assembly according to claim 1 wherein said tubular layers are configured so that, at the operating pressure of the assembly the tension in the wires comprising each of the layers is such that there is no more than about an 8% mean drop in tension between adjacent layers, whereby all of the layers share substantially in the overall loading of the assembly at its operating pressure.

10. An ultra-high pressure hose assembly according to claim 1 wherein said core is constructed of nylon, polypropylene or teflon material and said sleeve is constructed of a plastic material.

11. A pressure hose assembly designed to operate at sustained internal fluid pressures of at least 90,000 psi, said assembly comprising:
    (a) an innermost tubular core which adds at most negligible structural integrity to the overall assembly at its operating pressure but which functions as a fluid barrier;
    (b) a plurality of successive outer tubular layers respectively consisting of individual bands which are alternately helically wound around and directly against the layers immediately below them at predetermined helix angles whereby to form the plurality of tubular layers each band consisting of a number of separate steel wires which have opposing flat sides with rounded edges and which are positioned in unconnected edge to edge relationship to one another so as to form the band, the bands of successive layers starting with the innermost tubular layer defining successively increasing helix angles, said plurality of layers consisting of a predetermined number of said layers configured to define specific helix angles such that the overall burst pressure of said assembly exceeds 90,000 psi and so that, at the operating pressure of the assembly, the tension in the wires comprising each of the layers is such that there is no more than about an 8% mean drop in tension between adjacent layers, whereby all of the layers share substantially in the overall loading of the assembly at its operating pressure; and
    (c) an outer containment sleeve which adds at most negligible structural integrity to the overall assembly at is operating pressure but which contains said tubular layers.

12. A hose assembly according to claim 11 wherein said plurality of layers consist of eight such layers which for purposes of identification are designated as layers #1 through #8 starting with the innermost layers, the band forming each of said layers defining helix angles (rounded off to the nearest one degree), as follows:

| Layer | Helix angle |
|---|---|
| #1 | 39 |
| #2 | 45 |
| #3 | 49 |
| #4 | 52 |
| #5 | 73 |
| #6 | 75 |
| #7 | 82 |
| #8 | 84 |

13. A hose assembly according to claim 12 wherein the band forming each of said eight tubular layers consists of a specific number of separate ones of said steel wires, as follows:

| Layer | Wires |
|---|---|
| #1 | 20 |
| #2 | 20 |
| #3 | 20 |
| #4 | 20 |
| #5 | 10 |
| #6 | 10 |
| #7 | 5 |
| #8 | 5 |

14. An ultra-high pressure hose assembly designed to operate at sustained internal fluid pressures of at least 90,000 psi, said assembly consisting essentially of:
  (a) an innermost tubular core which adds at most negligible structural integrity to the overall assembly at its operating pressure but which functions as a fluid barrier;
  (b) eight successive outer tubular layers which for purposes of identification are designated as layers #1 through #8 starting with the innermost layers, said layers consisting of individual bands which are alternately helically wound around and directly against the layers immediately below them at predetermined helix angles whereby to form the plurality of tubular layers, each band consisting of a number of separate steel wires which have rectangular cross sections and which are positioned in unconnected side-by-side relationship to one another, the band forming each of said eight tubular layers consisting of a specific number of separate ones of said steel wires and defining a helix angle (in degrees rounded off to the nearest one-tenth of a degree) as follows:

| Layer | Wires | Helix Angle |
|---|---|---|
| #1 | 20 | 39.0° |
| #2 | 20 | 44.8 |
| #3 | 20 | 48.9 |
| #4 | 20 | 51.6 |
| #5 | 10 | 73.2 |
| #6 | 10 | 75.2 |
| #7 | 5 | 82.1 |
| #8 | 5 | 83.5 |

(c) an outer containment sleeve which adds at most negligible structural integrity to the overall assembly at its operating pressure but which contains said tubular layers.

15. An ultra-high pressure hose assembly according to claim 14 wherein at least the bands of said layers #1 through #6 are helically wound with substantially no gaps between turns.

16. An ultra-high pressure hose assembly according to claim 15 wherein the bands of said layers #7 and #8 are helically wound with substantially greater gaps between turns than the gaps between the turns of said layers #1 through #6 whereby the overall assembly is substantially more flexible than it would be if the bands of layers #7 and #8 were wound with substantially no gaps between turns.

17. An ultra-high pressure hose assembly according to claim 14 wherein the thickness of each of said wires forming each of said bands has a thickness of 0.0125 inch and a width of 32 mils.

* * * * *